United States Patent [19]
Savage et al.

[11] Patent Number: 6,152,022
[45] Date of Patent: Nov. 28, 2000

[54] BURNER MOUNTING ASSEMBLY FOR A DEEP FAT FRYER

[75] Inventors: Steven Johnathan Savage, Concord; David Wayne Tucci, Northfield; Anthony Francis Reale, Center Barnstead, all of N.H.

[73] Assignee: Pitco Frialator, Inc., Concord, N.H.

[21] Appl. No.: 09/533,597

[22] Filed: Mar. 23, 2000

[51] Int. Cl.[7] .............................. A47J 37/00; A47J 37/12
[52] U.S. Cl. .............................. 99/403; 99/330; 126/375; 126/391
[58] Field of Search .............................. 99/325–334, 337, 99/338, 403–410; 126/375, 378, 92 R, 92 AC, 390–392, 357, 360 R; 210/167, DIG. 8; 165/109.1; 219/492, 494, 497, 510, 512; 426/231, 233, 438, 519

[56] References Cited

U.S. PATENT DOCUMENTS

| | | | |
|---|---|---|---|
| 4,050,447 | 9/1977 | Terracciano | 99/330 X |
| 4,135,079 | 1/1979 | McGraw | 137/558 X |
| 4,210,123 | 7/1980 | Moore et al. | 137/563 X |
| 4,282,094 | 8/1981 | Mitchell | 210/167 X |
| 4,485,831 | 12/1984 | Ungerleider | 137/341 X |
| 4,599,990 | 7/1986 | Fritzsche et al. | 99/403 X |
| 4,622,135 | 11/1986 | Williams | 137/341 X |
| 4,646,793 | 3/1987 | Sherratt | 99/403 |
| 5,179,891 | 1/1993 | Chiu | 99/408 |
| 5,249,511 | 10/1993 | Shumate et al. | 99/408 |
| 5,315,921 | 5/1994 | Davis | 99/330 |
| 5,609,193 | 3/1997 | Steckler | 141/82 X |
| 5,629,039 | 5/1997 | Brintle | 426/417 |

*Primary Examiner*—Timothy Simone
*Attorney, Agent, or Firm*—Donald C. Casey, Esq.

[57] ABSTRACT

A modular burner mounting assembly for a deep fat flyer is described. A vertical plate is used to support each burner with a fuel-air mixture being admitted at one end, and a flame disposed at an opposite end, the flame being dimensioned to register on its respective heat tube so products of combustion are admitted to the heat tube at one end, travel through the tube heating an oil bath surrounding the tube and exits through the flue. A single pilot is integrally mounted on the mounting plate between a pair of centrally located burners so that the pilot simultaneously ignites the fuel-air mixture exiting from each burner. Carry over brackets are provided between the burners ignited by the pilot and adjacent burners so that the flame of one burner passes directly to a fuel-air mixture exiting an adjacent burner to ignite the same. In this way a single pilot can be used to ignite two, four, or even five burners or more as required.

15 Claims, 4 Drawing Sheets

BURNER MOUNTING ASSEMBLY FOR A DEEP FAT FRYER

CROSS REFERENCE TO RELATED APPLICATIONS

This patent application is related to pending U.S. patent application Ser. No. 08/724,233, filed Sep. 27, 1996 and to U.S. patent application Ser. No. 09/390,284, filed Sep. 3, 1999, both assigned to the assignee of this invention.

FIELD OF THE INVENTION

This invention relates to deep fat fryers and in particular to deep fat fryers in which the oil used for cooking is heated by a gas fired burner with two, three, four, five or six or more gas burners mounted at entrances to heat tubes which extend through the oil bath so that heat generated by the burner heats the walls by its respective heat tube, which in turn heats the surrounding oil bath.

DESCRIPTION OF THE PRIOR ART

Commercial deep fat fryers have been in use for many years and conventionally include a tank with one or more heat tubes extending through an oil bath in the tank. Cooking oil is heated by a gas burner which heats the tube or tubes so that the heat from the burner is transferred to the surrounding oil through the tube walls, with the products of combustion being exhausted through a flue. In fast food cooking operations where large quantities of food are cooked on a continuous basis, improving the efficiency of the heat transfer can result in significant cost savings.

Typically an in-shot burner directs combustion gases into one end of the fryer heat tube. Various configurations of tubes are known, such as U-shaped or S-shaped, and tubes that extend straight through the tank without bends are also known. In order to increase the dwell time of the hot combustion gases in the heat tube, baffles may be contained within the tube. Baffles are designed to cause the combustion gases to swirl, delaying passage through the tube into the flue. Baffles typically are metal and are also heated so that the heated baffle contributes to heating the tube walls both by conduction and radiation.

Typically a straight heat tube would not be used without baffles because of the shorter dwell time for the combustion gases passing through the heat tube from a burner at one end to the flue at the opposite end. U-shaped or S-shaped tubes with increased dwell times however present maintenance and corrosion problems at the bend of the tube.

In-shot burners used with heat tubes are often mounted co-axially with the tube extending horizontally, or they have a 90 degree bend so that the right angle burner is essentially L shaped with one leg of the L extending downwardly and the other leg extending co-axially with the heat tube. In both situations such burner housings present space problems because of their configuration.

Neither the right angle burner nor the horizontal in-shot burner is particularly desirable. The right angle burner intrudes into the space below and in front of the tank which makes servicing difficult and intrudes upon space normally occupied by elements of the system, such as the filter. The horizontal in-shot burners are typically short in length resulting in reduced gas input. Such burners have either lower input rating for reasonable efficiency and more tubes to achieve the desired input and efficiency thereby creating cleaning and manufacturing problems.

In the case of a commercial fast food type operation the kitchen often is crowded with equipment. The conventional burners described above require additional housing space to accommodate the burner itself. It has been discovered, however, that downwardly directed burners can be oriented at an angle to the heat tube longitudinal axis in order to provide an efficient assembly with reduced space requirements.

Once such burners are oriented at an acute angle to the vertical, such as 30 degrees to 40 degrees to the tank wall it is necessary to mount the burner housing so that the flame is directed precisely into the heat tube entrance. This is necessary to avoid excessive wear and corrosion within the tube and to provides for uniform heating of the tube wall.

Accordingly, there is a need to develop a housing assembly for such angled burners so that they can be precisely mounted on the respective heat tubes at a desired acute angle relative to the tank wall so that the downwardly directed burner will produce more efficient heat transfer than either the conventional in-shot horizontal burner or right-angled burner.

SUMMARY OF THE INVENTION

It has been discovered that a modular assembly of a plurality of downwardly directed in-shot burners can be provided which will facilitate the efficient mounting of the same on a deep fat fryer. The modular construction ensures that the burners will be accurately positioned relative to the respective heat tubes. In addition, the assembly includes an integral pilot with associated bracketing so that the pilot will simultaneously ignite an adjacent pair of burners, one on either side. In the event several burners are provided, the assembly also includes carry over brackets so that side-to-side ignition will be achieved from a single pilot. A single pilot then can be used to ignite two, four, five or more tubes, as desired.

Accordingly it is an object of this invention to provide a modular mounting assembly for a plurality of angled in-shot burners so that a deep fat fryer can be constructed with two or more such burners accurately positioned at a preferred angle of 35 to 40 degrees to the vertical tank wall in a deep fat fryer assembly.

It is another object of this invention to provide an efficient ignition structure for a plurality of burners in a deep fat fryer assembly wherein a single pilot simultaneously ignites adjacent pairs of burners.

It is still another object of this invention to provide a side to side ignition bracket for burners in a deep fat fryer assembly wherein the flame from one burner blows into the adjacent burner to ignite gas therein so that adjacent burners can be ignited with only a single pilot for the assembly.

It is yet another object of this invention to provide a deep fat fryer assembly which may be reliably mass produced wherein a burner mounting assembly is provided in modular form with a plurality of in-shot angled burners whereby said burners and the associated ignition pilot can be accurately mounted on heat tube entrance ports in a deep fat fryer tank as one unit.

These and other objects will become readily apparent with reference to the drawings and follow description wherein:

BRIEF DESCRIPTION OF THE DRAWINGS

FIG. 5b is a rear view of the modular assembly of FIG. 5a; and

DETAILED DESCRIPTION OF THE PREFERRED EMBODIMENT

Figure 1:
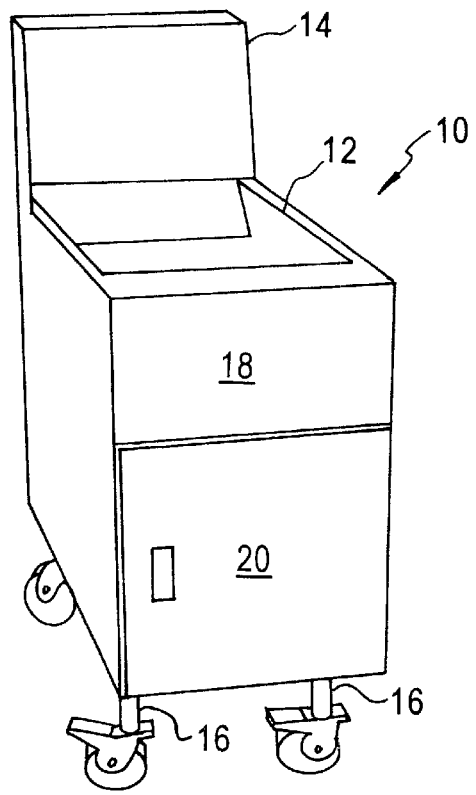
FIG. 1 is a prospective view of a deep fat fryer of this invention.

With attention to the drawings and FIGS. 1–4 in particular, the deep fat fryer of this invention 10 includes a tank 12 a rear flue 14 and may be mounted on wheels 16. The front 18 has an access door 20 for access to the burners as will subsequently described. A filter system (not shown) could be provided with access from the door 20.

Figure 2:
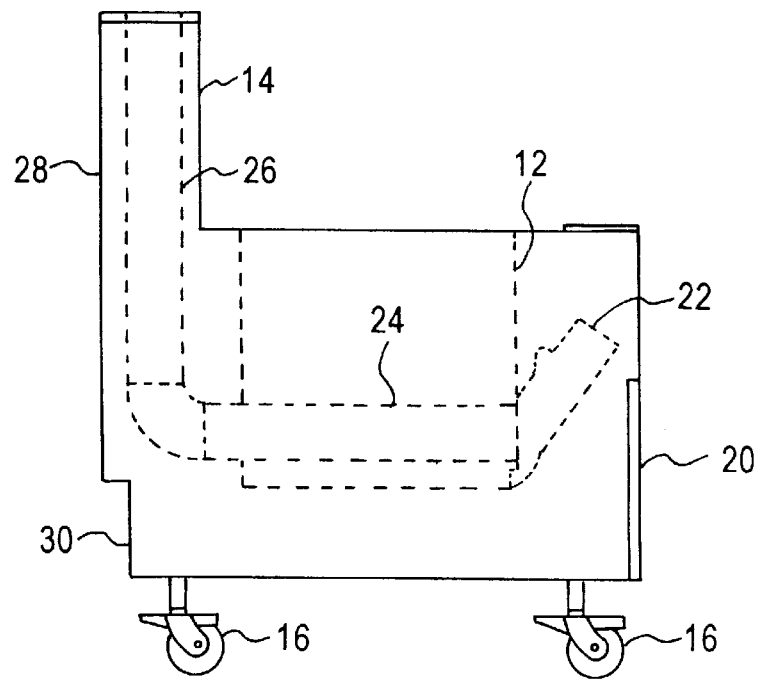
FIG. 2 is the side view of the deep fat fryer of FIG. 1.
Figure 3:
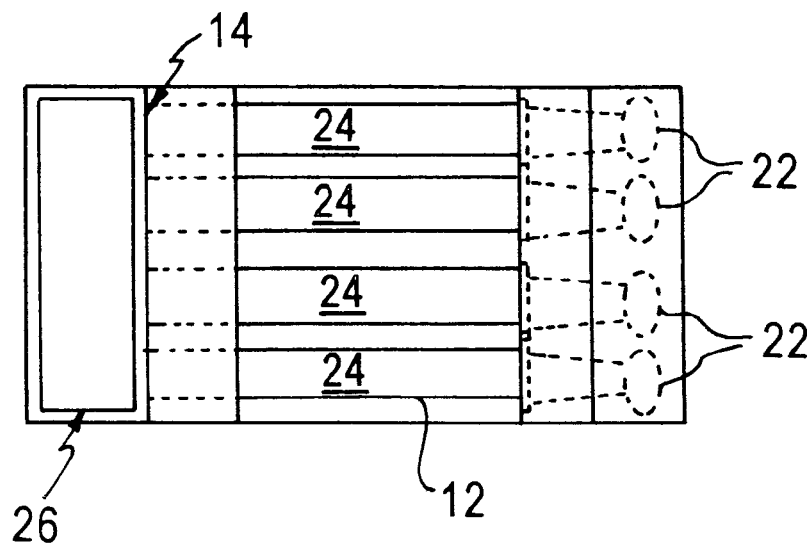
FIG. 3 is a top view of one embodiment of the deep fat fryer of this invention showing four heat tubes.
Figure 4:
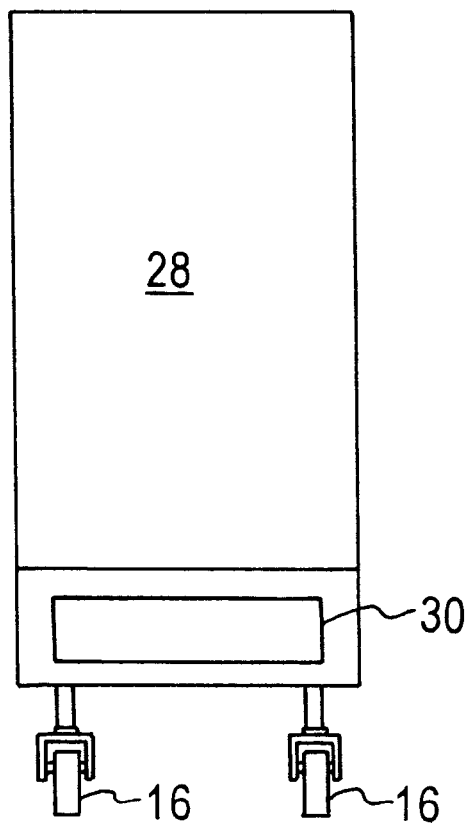
FIG. 4 is a rear view of the deep fat fryer of FIG. 1.

In the embodiment of FIG. 2 there is shown schematically a burner assembly 22 with a heat tube 24 extending through the tank 12 to the flue pipe 26 in flue 14. The source of gas for the burner 22 is not shown in this figure but will be subsequently described. Burner 22 then sends a jet of gaseous products of combustion through heat tube 24 and the oil (not shown) disposed in tank 12 will be heated by conductive heat transfer from the walls of the tube 24. The products of combustion exit tube 24 into the flue pipe 26 for exhaustion. As shown in FIG. 4 f the rear 28 of the fryer 10 defines an opening 30 which is source of air for burner 22. Air also is admitted from beneath the fryer 10 and between front 18 and door 20. In the embodiment of FIG. 3 four heat tubes 24 are shown extending through a single tank 12. Each tube 24 has a separate burner 22. As will be obvious to those skilled in the art, twin deep fat fryers may be provided with two burners each, or typically, four, five, six or more burners may be provided in a single tank. The kitchen space requirements will dictate, at least in part, the size of the tank and deep fat fryer used. In some situations a deep fat fryer with two tubes would be sufficient whereas if more space is available, and a higher volume of food is to be cooked, it may be necessary to use a larger tank with six or more heat tubes. In each case each tube would have its own burner.

In the preferred embodiment of this invention a burner is disposed at an angle to the longitudinal axis of the heat tube. The modular design of this invention could use a conventional in-shot burner wherein the burner axis corresponds with the longitudinal axis of the heat tube or, if space is available, a 90 degree or right angle burner may be used wherein the burner makes a 90 degree turn to align with the longitudinal axis of the heat tube. In the preferred embodiment of this invention, however, the burner is mounted at an acute angle to the face of the tank 12 at from about 35 to 40 degrees or at an angle of about 50 to 55 degrees of the longitudinal axis of the heat tube.

Figure 5A:
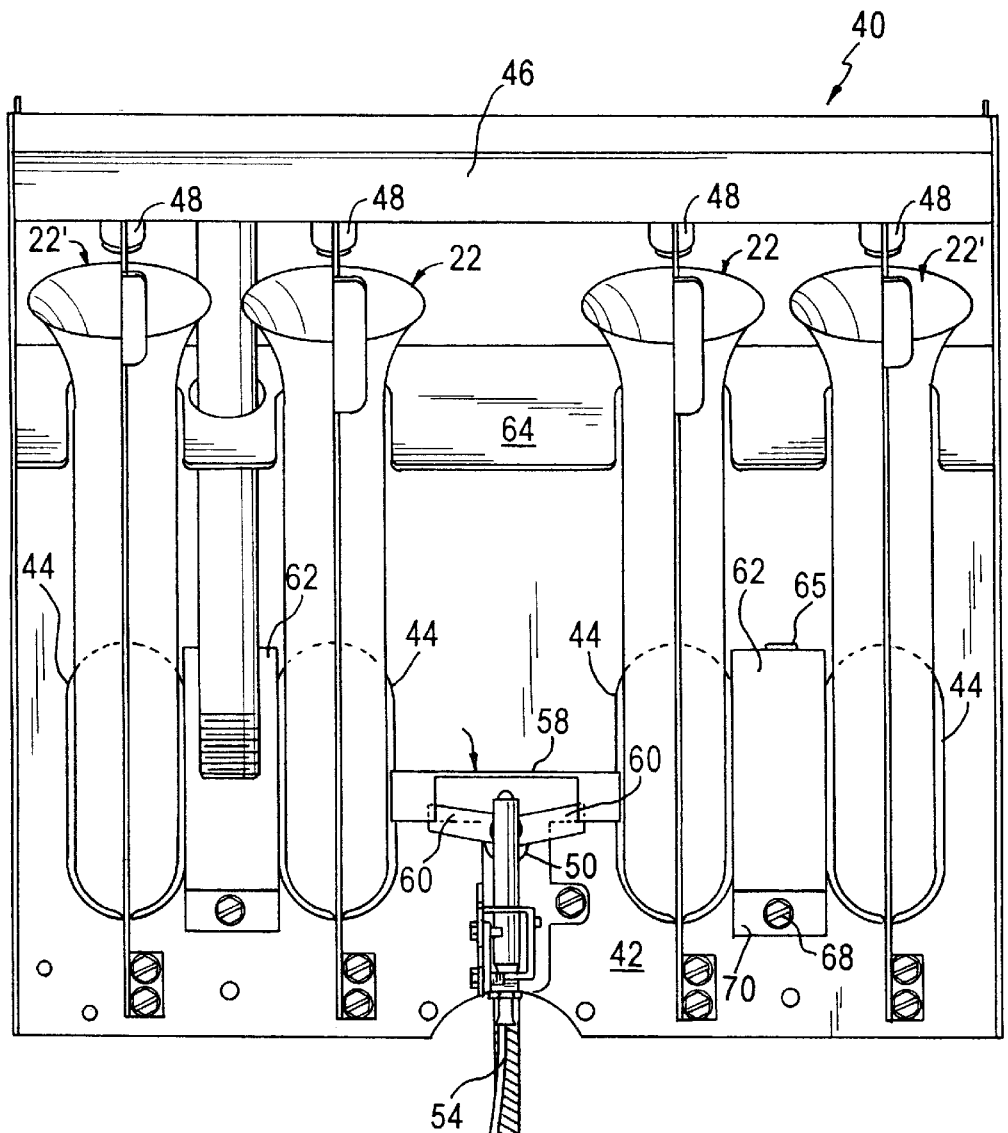
FIG. 5a is a front view of the modular burner assembly for the deep fat fryer of FIGS. 1–4.
Figure 5B:
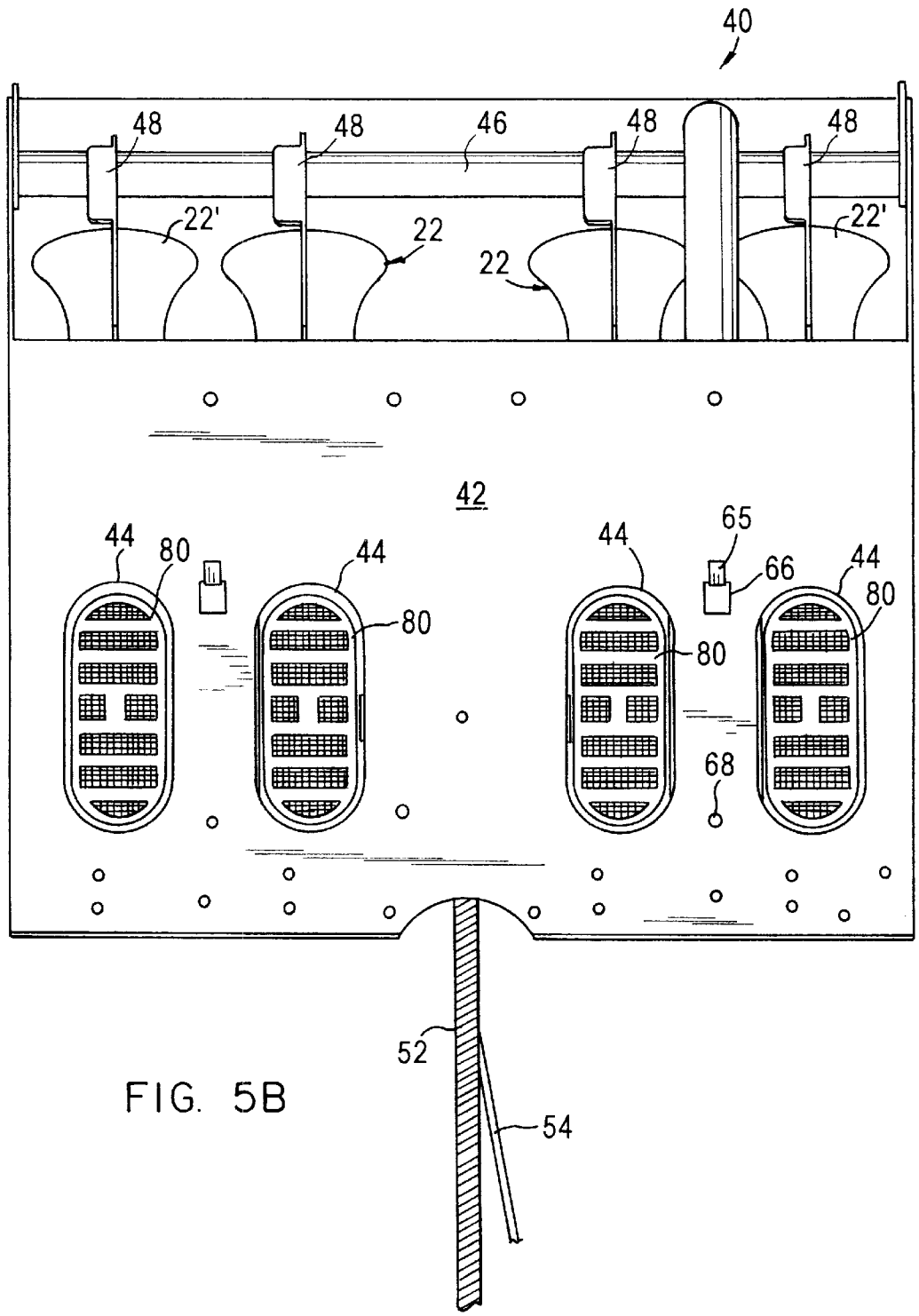

With attention to figure 5a and 5b, the modular burner mounting assembly of this invention 40 is a unitary structure which includes, as shown, two inner burner 22 and two outer burner 22' rigidly mounted on a backing plate 42. Plate 42 has an opening 44 for each burner 22 which when assembled registers with the entrance to each respective heat tube.

As will be obvious to those skilled in the art, the embodiment shown consists of four burners 22 and 22', but the deep fat fryer design could encompass only two burners 22 or three, four, five or six or more, and this invention is not intended to be limited to the number of burners provided. In addition, the device shown in the embodiment of FIG. 3 is a single tank with four heat tubes. However, the tank could be divided so that two heat tubes 24 are provided on each side of a longitudinally extending central wall (not shown).

Assembly 40 includes a gas manifold 46 with a burner jet 48 for each burner 22 and 22'. Gas from each jet 48 enters the burner at the belled entrance along with primary air. The fuel-air mixture proceeds downwardly through each burner 22 and 22' and through opening 44, thereby exiting burner 22 and 22'. A pilot 50 is provided centrally located between adjacent burners 22. The pilot 50 is supplied by gas line 52 and an ignitor 54 is provided. The pilot 50 is mounted on plate 42 by a bracket 56 which includes a roof portion 58 and wings 60 extending laterally towards the adjacent openings 44 in plate 42. When ignitor 54 ignites the pilot 50 the flame will be directed laterally through the wings 60 to ignite the adjacent burners 22. A carry over bracket 62 is provided between the next adjacent burners so that the flame from one burner 22 will pass through bracket 62 to ignite the adjacent burner 22'. In this way a single pilot can be used to ignite at least four of such burners. A roof 64 is provided over pilot mounting assembly 56 which will (1) redirect flames to light burners, (2) keep flames from being drawn into the burner venturi.

Figure 6:
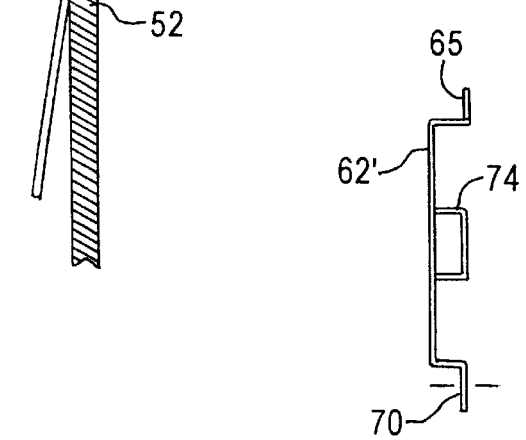
FIG. 6 is a side view of one embodiment of the carry over bracket for the modular assembly of FIGS. 5a and 5b.

With reference to FIG. 6, the carry over bracket 62 shown in FIG. 5a is a flat piece of metal secured by a flange 65 at the top thereof in an opening 66 in mounting plate 42 and below by a bolt 68 through a lower flange 70. In the embodiment of FIG. 6 the mounting bracket 62' is provided with the upper flange 65 and the lower flange 70. It also includes a conduit 74 to direct the flame across the bracket 62' from one burner 22 to the adjacent burner 22'.

With attention to FIG. 5b, each burner 22 terminates in a screen plate 80. The burner 22 or 22' is designed so that the flame is spread across plate 80 and enters the heat tube 24 spread from top to bottom thereof In a conventional burner situation typically buoyancy will cause the flame to pass through the heat tube along its upper portion. This results in poor heat transfer because the entire heat tube wall is not utilized. In other words, the upper portion of the tube will be hotter than the lower portion. The spreader plate 80 is designed, along with the angled burner 22, to more uniformly heat the heat tube 24 as the flame progresses and the products of combustion travel through the tube 24 to the flue 26.

Plate 80 also is slightly smaller than opening 44 for each burner 22 or 22' to permit admission of secondary air to the burners. Burners 22 and 22' in the preferred embodiment are identical in dimensions and each burner with its plate 80 is rigidly attached to plate 42 at the same acute, downward angle, preferably of 35–40 degrees. When mounted on tank 12 plate 42 would be disposed vertically, parallel to the tank wall.

The modular plate assembly 40 is mounted on the tank 12 and can be accessed through door 20 in the fryer 10. The burner assembly 40 then can be bench tested in modular form before mounting in a respective fryer unit 10 and when installed insures the proper orientation and angle for the burners 22 relative to the heat tubes 24. The integral pilot 50 with its heat shield 56 then efficiently ignites the adjacent burners 22 which in turn pass the flame through brackets 62 or 62' to the burners 22' adjacent thereto. A single pilot can be used to ignite a four five, six or more burner assembly, or, if only two tubes are used, the single pilot can used to ignite only the adjacent two burners.

In summary, a modular burner mounting assembly for a deep fat fryer is disclosed herein. Burners are mounted on a metal plate each terminating in a hole or outlet port which when the Ad plate is mounted on the wall of a tank will register on each heat tube extending through the tank. The assembly also includes an integral pilot centrally mounted between adjacent burner tube holes on the mounting plate. The pilot has a mounting bracket which provides wings extending laterally along the plate to the adjacent burner holes. The mounting bracket further includes a roof over the pilot so that when the pilot is ignited flame will spread laterally through the wings to the adjacent burner holes.

When the burners on opposite sides of the pilot have a fuel-air mixture passing therethrough the pilot will simultaneously light the two burners. Each burner exit port is covered by a screen or mesh plate which is contained in a vertical plane and is disposed at the hole in the mounting plate. Each of the screened plates is dimensioned slightly smaller than the hole so that secondary air can be entrained into the burner flame as it enters the tube. Each burner is served by a jet at the upper end so that a fuel-air mixture enters the burner at one end and a flame is produced at the opposite end at the entrance to the heat tube passing through the oil bath tank.

In the case of additional burners, carry over brackets are disposed between the burner holes directly served by the pilot and holes disposed laterally so that when the pilot ignites one burner, the flame will pass laterally through the carry over bracket to ignite an adjacent burner. In this way a single pilot can be used to light two or more burners in a single fryer installation.

In the preferred embodiment of this invention the burners extend downwardly at an acute angle to the tank wall terminating in the vertically disposed screen plate. The preferred angle for each burner is an acute angle from 35–40 degrees to the vertical. At this angle then the buoyant effect on the flame entering the tube will be minimized so that the tube is heated uniformly from top to bottom rather than along the upper portion alone.

The modular design of this invention ensures that the burner assembly with its associated ignitor and pilot can be dimensioned to have each burner precisely oriented on its respective heat tube and the entire assembly can be bolted on the tank or otherwise attached.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. In a gas fired deep fat fryer having a tank containing cooking oil with vertical front, side, and back walls, the front and back walls mounting a plurality of horizontal heat tubes with the front wall defining an entrance opening for each heat tube and the back wall defining an exit opening for each heat tube the improvement comprising:

a modular burner assembly mounted on the front wall of said tank, said assembly having a separate elongated burner registering on each heat tube opening and a single integral pilot means for simultaneously igniting said burners, each burner having an exit opening contained in a vertical plane disposed parallel to its respective front wall entrance opening and dimensioned to be received therein and a flame spreader plate covering the exit opening of each burner.

2. The fryer of claim 1 wherein said assembly further comprises a mounting plate having said burners affixed thereto, said plate being normally mounted on the front wall of said tank and having a plurality of openings registering on the entrance openings of said tank front wall, each burner being mounted on said plate with its flame spreader plate contained within a vertical plane containing said plate opening.

3. The fryer of claim 2 wherein each burner has a longitudinal axis disposed at an acute angle to said plate.

4. The fryer of claim 3 wherein the angle is from about 35 to 40 degrees.

5. The fryer of claim 3 wherein a gas manifold is mounted on said plates, an entrance end being provided on each burner and a separate gas jet extending from said manifold into the entrance end of each burner to supply gas to said burner so that a primary air and gas mixture will be admitted to each burner at the entrance end.

6. The fryer of claim 5 wherein said pilot is mounted on said plate between an adjacent first pair of the plate openings and burner flame spreader plates, and means for splitting said pilot flame are provided so that when a gas-air mixture is present in said burners the pilot will simultaneously ignite the same at the respective burner flame spreader plates.

7. The fryer of claim 6 wherein said splitting means includes a mounting bracket for said pilot having lateral wings extending from said pilot to each of adjacent first plate openings.

8. The fryer of claim 7 wherein said pilot includes an upwardly opening gas jet mounted on said plate, an ignitor, and said splitting means, includes a plate spaced above said jet wherein said plate will split the pilot flame from said jet and direct the same into said lateral wings.

9. The fryer of claim 8 wherein a second opening is disposed laterally outboard each of said first adjacent openings in said plate and separate burners are mounted with respective flame spreader plates therein, said assembly further comprising flame carryover means for directing a flame from a first opening to a lateral outboard opening to ignite successive burners from an initial pilot flame.

10. The fryer of claim 9 wherein said carryover means includes a plate extending between said first end lateral openings and spaced away from said mounting plates.

11. The fryer of claim 10 wherein said carryover means includes a flame conduit extending between said openings and mounted on said carryover plate.

12. The fryer of claim 6 wherein said tank is divided by an internal upstanding wall extending from the front wall to the back wall thereof and a pair of openings is disposed on either side of said wall.

13. The fryer of claim 1 wherein four heat tubes are provided with four respective burners.

14. The fryer of claim 1 wherein two heat tubes are provided with two respective buners.

15. The fryer of claim 5 wherein the entrance end of each burner is bell shaped to admit primary air with the gas from the respective gas jet.

* * * * *